Feb. 28, 1928.
T. E. MURRAY, JR
1,660,425
ELECTRIC BUTT WELDING
Filed Sept. 10, 1924
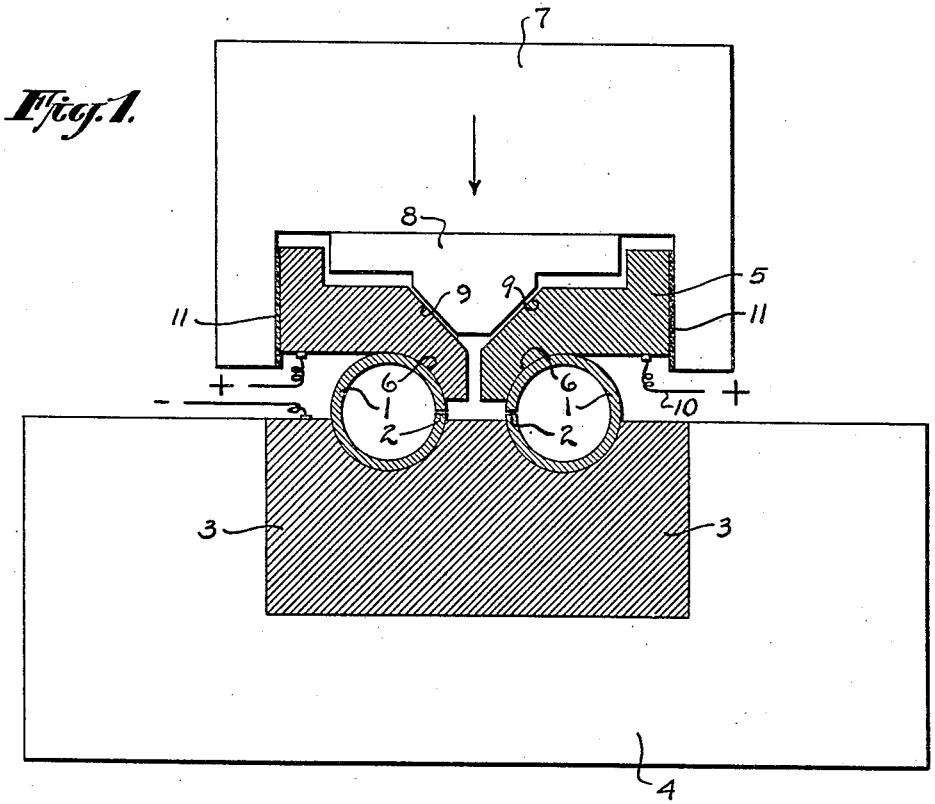
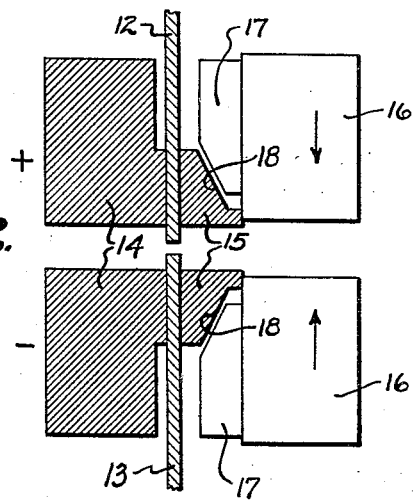

Patented Feb. 28, 1928.

1,660,425

UNITED STATES PATENT OFFICE.

THOMAS E. MURRAY, JR., OF BROOKLYN, NEW YORK.

ELECTRIC BUTT WELDING.

Application filed September 10, 1924. Serial No. 736,815.

In welding operations by means of electrodes which press the parts together while passing a current across the joint there are sometimes difficulties in maintaining a perfect contact of the electrodes with the work during the forward pressing movement. My invention is directed particularly to the avoidance of such difficulties and generally to the securing of a good contact of the electrodes with the work. The accompanying drawings illustrate embodiments of the invention.

Fig. 1 is a sectional view illustrating the welding of tubular articles.

Fig. 2 is a similar view illustrating the welding of plates.

There are a number of tubular products which can be economically made from sheet metal by bending over the edges of a blank and welding such edges together. Examples of such products and methods of production are described in previous applications of Thomas E. Murray Numbers 509,938 and 563,943. Fig. 1 illustrates two such blanks 1, bent around to bring the edges 2 together, and electrodes for pressing such edges together and taking up a certain quantity of the metal while passing a current across the joint. The apparatus is shown for working on two blanks at once, but the principle is equally applicable for working on a single blank. A bottom electrode 3 carried in a shoe 4 is grooved to provide seats for the two blanks which are arranged with the edges on the inner side, that is adjacent to each other. Two top electrodes 5 are used, one for each blank and shaped with a bearing face 6 engaging the quadrant of the blank near the joint. When such electrodes are pressed forward there is a certain movement of the blank due to the closing of the air gap and the taking up or extrusion of metal at the joint. This involves a change in the shape of blank and a movement therewith relation to the electrodes approximately in a circular direction around the center of the blank. If the electrode made a perfect contact at the beginning of the movement, therefore, the contact at the end would be imperfect and there would be a loss of efficiency. I propose to avoid, or at least to minimize, this difficulty by first forcing the electrodes against the blank in a direction transverse to the advance of the electrode during welding. The electrodes 5 are loosely carried in the top electrode shoe 7 and a wedge 8 is carried by said shoe having oblique faces bearing on similar faces 9 of the electrodes. The electrodes are connected by flexible leads 10 to the same source of welding current and are preferably separated from the shoe 7 by insulating material 11.

Now, when the shoe 7 is pressed downward the first effect is to press the electrodes 5, against the yielding insulating sheets 11, laterally as well as forward, so that they will grip the blank over a wide area. It is particularly important in this connection that the lower end of the electrode, nearest the edge of the blank, move laterally to such a position that in the subsequent forward movement the blank will not, by bending further inward, escape the edge of the electrode.

The invention is particularly useful in connection with the method of welding described in my re-issue Patent No. 15,466 of October 10, 1922 in which a current of extremely high amperage is passed across the joint for a very brief interval of time, generally a fraction of a second. In such an operation it is important that the electrode engage the work properly in the beginning, since there is very little time for adjustment afterwards. In this method of welding also it is particularly important that the electrode engage the work close to the joint.

The bottom structure may be made practically a repetition of that of the top, with two electrodes of the same polarity engaging the two different blanks. Or a single electrode may be used at the bottom, as illustrated, with recesses which fit the ultimate shape of the blank. For a single tube a single one of the electrodes 5 could be used with a bottom electrode which is similarly adjustable laterally; or one of the electrodes may be thus adjustable to avoid slip and the other may be fixed against lateral movement.

The pressing of the upper shoe 7 downward first wedges the electrodes to a good fit on the work and, second, forces the electrodes down to close the air gap and to press the parts together. The current is then turned on and, the pressure continuing, a determined quantity of the metal is taken up. The electrode is capable of a slight lateral movement sufficient to avoid slipping during the advance as the shape of the work changes.

While the invention is of particular importance in connection with curved pieces of work, like the portions of the blank 1 which are to be joined, it is useful also in connection with work pieces of other shapes. Fig. 2 shows its application to the butt welding of two plates 12 and 13. The plate 12 is clamped between two sections 14 and 15 of one electrode and the plate 13 between similar sections of an electrode of opposite polarity. Preferably both the parts 14 and 15 are of copper or similar highly conducting material, so as to pass the current to both faces of the work, though in some cases only one of these parts needs to be of such material. The electrodes are clamped and advanced by means of shoes 16 carrying wedges 17 adapted to bear against inclined faces 18 of the electrodes 15. When the parts 16 are advanced the first effect is a lateral pressing of the electrodes 15 against the work so as to ensure the closest contact therewith; after which the continued movement of the parts brings the edges of the plates 12 and 13 together and, the welding current being turned on, takes up the parts sufficiently to produce a good welded joint.

Although I have described with great particularity of detail certain embodiments of my invention, yet it is not to be understood therefrom that the invention is resricted to the particular embodiments disclosed. Various modifications thereof in detail and in the arrangement of the parts may be made by those skilled in the art without departure from the invention as defined in the following claims.

What I claim is:

1. In a welding machine of the character described, electrodes adapted to engage two pieces of work arranged alongside of each other and mechanism for pressing said electrodes in opposite lateral directions to maintain close engagement with the work while also pressing them forward to take up the joints of the two workpieces.

2. In a welding machine of the character described, an electrode which is adapted to yield laterally and means whereby a forward pressure thereon causes a lateral movement and pressure of said electrode against the work during the welding operation.

3. In a welding machine of the character described, an electrode adapted to yield laterally and a forwardly movable part engaging said electrode along a line inclined to such forward movement to press it laterally and forwardly during the welding operation.

4. In a welding machine of the character described for welding longitudinal joints in a pair of tubes alongside of each other, the combination of forwardly moving means for pressing the parts together at the joint and electrodes which fit the curved faces of the work and are pressed laterally in opposite directions against the respective tubes by the forward movement of said means.

5. In electric welding by pressing the parts together between electrodes, the method of advancing an electrode which consists in moving it laterally against the work and forwardly to take up the work, both during a single welding movement of the electrode.

6. The method of electrically welding work pieces which tend to yield laterally when pressed forward, which includes pressing them together between electrodes while passing a current across the joint, forcing the electrodes laterally against the work and forwardly to take up metal at the joint, both during a single welding movement of the electrodes.

7. In the electric welding of work having a curved face by pressing the parts together between electrodes, the method of advancing an electrode which consists in moving it laterally into engagement with said face and forwardly to take up the work, both during a single welding movement of the electrode.

In witness whereof, I have hereunto signed my name.

THOMAS E. MURRAY, Jr.